United States Patent [19]

Barahia

[11] 4,184,658

[45] Jan. 22, 1980

[54] CUSHION MOUNT FOR PRIME MOVER

[75] Inventor: Manoj M. Barahia, Sycamore, Ill.

[73] Assignee: General Electric Company, Fort Wayne, Ind.

[21] Appl. No.: 877,084

[22] Filed: Feb. 13, 1978

[51] Int. Cl.² .............................................. F16M 13/00
[52] U.S. Cl. ...................................... 248/606; 248/613
[58] Field of Search ................... 248/26, 7, 15, 16, 22, 248/358 R; 310/91; 29/401 F

[56] References Cited

U.S. PATENT DOCUMENTS

| | | | |
|---|---|---|---|
| 2,047,838 | 7/1936 | Smith et al. | 248/22 X |
| 2,883,132 | 4/1959 | Neher | 248/26 |
| 3,235,207 | 2/1966 | Church | 248/26 |
| 3,285,547 | 11/1966 | Henry | 248/26 |
| 3,442,521 | 5/1969 | Rutledge | 248/26 X |
| 3,509,393 | 4/1970 | Roddy | 248/26 X |

Primary Examiner—J. Franklin Foss
Attorney, Agent, or Firm—Joseph E. Papin

[57] ABSTRACT

A cushion mount for mounting a prime mover or the like is formed with a rigid outer ring portion of reinforced polypropylene. The outer ring portion has an outer peripheral configuration adapted for engaging a mounting bracket or the like of such prime mover, an inwardly projecting rib on its inner periphery. A relatively elastic, resilient inner ring portion of the cushion mount is formed of an elastomer blend of a poly(monoalkenyl arene)/hydrogenated polydiene/poly(monoalkenyl arene) block copolymer with a polyamide polymer and is molded directly to the inner periphery of the outer ring portion, the inner ring portion having an inner peripheral configuration adapted for mounting engagement with a part of the prime mover.

7 Claims, 4 Drawing Figures

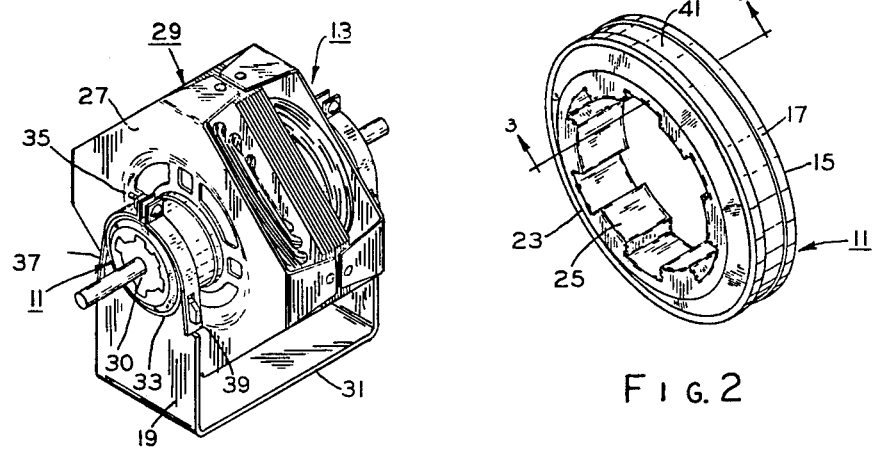
FIG. 2
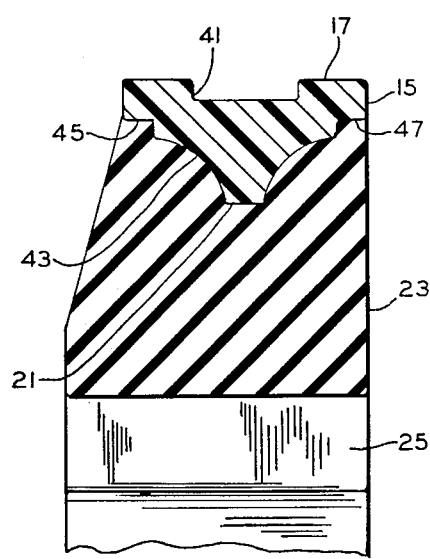
FIG. 1
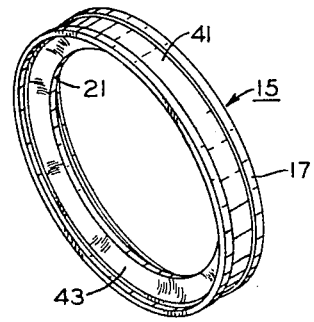
FIG. 4
FIG. 3

CUSHION MOUNT FOR PRIME MOVER

FIELD OF THE INVENTION

The present invention relates in general to cushion mounts and more particularly to those utilized for mounting engagement with a part of a prime mover.

BACKGROUND OF THE INVENTION

In the past, various and sundry mounting devices including cushion mounts were adapted for mounting engagement with a part of a prime mover, such as a dynamoelectric machine or electric motor for instance. One such past cushion ring is disclosed in U.S. Pat. No. 3,285,547 issued Nov. 15, 1966 to R. L. Henry. This past cushion mount comprises a substantially rigid outer ring formed of a heat hardenable resin, and a relatively more flexible inner resilient elastomeric ring is molded thereto. The inner ring was mechanically interlocked with the outer ring by means of a rib on the inner periphery of the outer ring and having interlock openings therethrough. During the molding of the inner ring to the outer ring, the inner ring material flowed through the openings, thus providing a strong mechanical interlock between the inner and outer rings. The patent to Henry disclosed the use of a bonding agent or cement between the inner and outer rings which is believed to be a disadvantageous or undesirable feature tending to add cost to the cushion ring.

An earlier form of a resilient cushion mount was disclosed in U.S. Pat. No. 2,047,838 issued July 14, 1936 to H. A. Smith et al.

SUMMARY OF THE INVENTION

Among the several objects of the present invention may be noted the provision of an improved cushion mount for a prime mover which overcomes at least the disadvantageous or undesirable feature discussed above, as well as others, with respect to the prior art; the provision of such improved cushion mount having a generally stiff outer ring portion and a generally resilient inner ring portion with such ring portions being bonded directly to each other; the provision of such improved cushion mount in which the inner and outer ring portions are chemically bonded together by a chemical reaction between the materials of the inner and outer ring portions when they are molded together; the provision of such improved cushion mount in which the chemical bonding of the inner and outer ring portions results in improved pulling or separation strengths or characteristics between the inner and outer ring portions; and the provision of such improved cushion mount which is simple in design, easily assembled and economically manufactured. These as well as other objects and features of the present invention will be in part apparent and in part pointed out hereinafter.

In general and in one form of the invention, there is provided a cushion mount for mounting prime movers and the like on a mounting bracket therefor. The cushion mount has provided with a generally rigid outer ring portion formed of reinforced polypropylene, and the outer ring portion has an outer peripheral configuration adapted for engagement with a part of the mounting bracket and an inwardly projecting rib on an inner periphery of the outer ring portion. A generally resilient inner ring portion is formed of an elastomer blend of poly(monoalkenyl arene)/hydrogenated polydiene/poly(monoalkenyl arene) block copolymer and a polyamide polymer. The inner ring portion is molded directly within the inner periphery of the outer ring portion and has an inner peripheral configuration adapted for gripping engagement with the prime mover. The inner and outer ring portions define a substantially integral cushion ring which is relatively rigid adjacent its outer periphery and relatively resilient adjacent its inner periphery.

BRIEF DESCRIPTION OF THE DRAWINGS

FIG. 1 is a partial perspective view of an exemplary prime mover showing a cushion ring in one form of the invention in mounting engagement therewith;

FIG. 2 is a perspective view of the cushion ring shown in FIG. 1 and isolated from the prime mover;

FIG. 3 is an enlarged sectional view taken along line 3—3 of FIG. 2; and

FIG. 4 is a perspective detail view of an outer component ring of the cushion ring shown in FIG. 1.

Corresponding reference characters indicate corresponding parts throughout the several views of the drawings.

The exemplifications set out herein illustrate the preferred embodiments of the invention in one form thereof, and such exemplifications are not to be construed as limiting the scope of the invention in any manner.

DETAILED DESCRIPTION OF THE PREFERRED EMBODIMENT

Referring now to the drawings in general, a cushion mount or ring 11 adapted for mounting or resilient engagement with an exemplary prime mover, such as a dynamo-electric machine or an electric motor 13 for instance, is shown in mounting association therewith (FIG. 1). Cushion mount 11 has a generally rigid outer ring or annular portion 15 formed of a reinforced polypropylene, and the outer ring includes an outer peripheral portion or configuration 17 adapted for engaging with a part, such as a mounting bracket 19 or the like of prime mover 13, and also an inwardly projecting rib or flange 21 on the inner periphery of the outer ring (FIGS. 3 and 4). Cushion mount 11 is also provided with a generally resilient inner ring or portion 23 formed of an elastomer blend of poly(monoalkenyl arene)/hydrogenated polydiene/poly(monoalkenyl arene) block copolymer and a polyamide polymer (FIGS. 2 and 3). Inner ring 23 is molded directly to or within the inner periphery of outer ring 15, and the inner ring has an inner peripheral configuration 25 for gripping or resilient mounting engagement with another part, such as an end plate 27 or the like, of prime mover 13 (FIGS. 1–3).

More particularly and with specific reference to FIGS. 1 and 2, prime mover 13 is provided with a housing, indicated generally at 29, including end plate 27 which has a hub or land and groove extension 30 protruding therefrom, and the hub is provided with a configuration generally complementary to the inner configuration of inner ring 23 on cushion mount 11 so as to receive the inner ring in the gripping engagement or resilient mounting therewith, as previously mentioned. Prime mover 13 may be disposed in a supporting device or cradle 31, as is well known in the art, and the cradle includes mounting bracket 19 having a seating surface 33 with a shape generally complementary to at least a part of the outer configuration 17 of outer ring 15 on cushion mount 11 so as to seat the outer ring, as discussed in greater detail hereinafter. When so seated, cushion ring 11 is secured against rotation with respect to cradle 31 by adjustably tightening a screw 35 threadedly engaged between a pair of clamps 37, 39 which are secured to mounting bracket 19. In this manner, the clamping pressure exerted by clamps 37, 39 on cushion ring 11 generally secures outer ring 15 on cradle seating surface 33 against rotation, and the engagement of inner ring 23 with hub 30 of end plate 27 resiliently mounts prime mover 13 with respect to cradle 31. For the sake of brevity, only one end of prime mover 13 has been described as resiliently arranged with cushion mount 11, but it is readily apparent that the other end of the prime mover could also be resiliently mounted by another cushion ring to cradle 31.

An annular channel or groove 41 is provided in outer peripheral portion 17 of outer ring 15, as best seen in FIGS. 2-4, and the channel is adapted to receive seating surface 33 of mounting bracket 19 on cradle 31. Rib 21 is integrally formed with outer peripheral portion 17 of outer ring 15 extending generally radially inwardly thereof. A substantial surface, indicated generally at 43, is provided on rib 21 for contact or bonding engagement with inner ring 23 when the inner ring and outer ring 15 are molded together, and it may be noted that the rib is imperforate. Inner ring 23 is molded in place within outer ring 15 in bonding engagement with surface 43 of rib 21 on the outer ring and also with a pair of surfaces 45, 47 on outer peripheral portion 17 of the outer ring which face radially inwardly thereof and which extend on opposite sides of the rib, as best seen in FIG. 3. While inner peripheral configuration 25 of inner ring 23 is shown as a plurality of lands and grooves, it is contemplated that other configurations may be utilized within the scope of the invention so as to meet the objects and advantageous features thereof.

The construction of cushion ring 11 is such that it is both rigid and highly resistant to distortion during use, maintaining its shape and position to resist the various lateral, torsional, radial and other forces which may arise from mounting the cushion ring with prime mover 13 and which dampens vibrations and minimizes the noise level during operation of the prime mover. To this end, outer ring 15 is is formed from a relatively rigid, stiff plastic material while inner ring 23 is formed from a relatively elastic, resilient plastic or elastomeric material. Because of the differing physical properties of outer and inner rings 15, 23, it is important that the outer ring and inner ring be securely bonded together in order to prevent separation or peeling during use. To facilitate the manufacturing operation, it is further desirable that inner ring 23 be moldable directly onto outer ring 15 without the use of mechanical interlocking confiigurations or the addition of separate bonding agents or cements.

In accordance with the present invention, a particularly unique and efficacious combination of materials has been discovered which, when utilized to mold outer ring 15 and then subsequently mold inner ring 23 directly within the outer ring, produces a unitary, almost integral, substantially peel-proof cushion ring having the properties of a relatively rigid outer ring and a relatively elastic or resilient inner ring. To this end, outer ring 15 is formed of a moldable, stiff, rigid polymer, such as polypropylene, which, for additional rigidity, is approximately 30 to 40% glass fiber filled and has physical properties as set forth in Table I:

TABLE I

PHYSICAL PROPERTIES FOR OUTER RING 15
(measured at about 23° C.)

| | A.S.T.M. Test Method | Glass Reinforced Polypropylene |
|---|---|---|
| Glass Fiber % | D-792 | 30–40 |
| Specific Gravity | D-955 | 1.1–1.25 |
| Tensile Strength, P.S.I. | D-638 | 7000–8500 |
| Tensile Elongation, % | D-638 | 1.0–2.5 |
| Tensile Modulus, P.S.I. $\times 10^6$ | D-638 | 1.00–1.5 |
| Compressive Strength, P.S.I. | D-695 | 8000–9000 |
| Hardness, Rockwell R | D-785 | 90–105 |
| Deflection Temp. °F., at 264 P.S.I. | D-648 | 290–310 |
| at 66 P.S.I. | D-648 | 310–330 |
| Coefficient of Linear Thermal Expansion, in./in./°F. $\times 10^{-5}$. | D-696 | 1.8–2.2 |

Glass filled polypropylene of the foregoing characteristics is a conventional, readily available material, one commercially available material being available as Blend RTP-107 from the Fiberite Corporation, Winona, Minnesota. While the polypropylene of outer ring 15 is disclosed as being reinforced with glass fibers, it is contemplated that other material may be utilized to provide such reinforcement within the scope of the invention so as to meet the objects and advantages thereof.

Inner ring 23 is formed of an elastomeric polymer comprising an elastomer blend of a poly(monoalkenyl arene)/hydrogenated polydiene/poly(monoalkenyl arene) block copolymer with a polyamide polymer, the elastomer blend having physical properties as set forth in Table II:

TABLE II

PHYSICAL PROPERTIES FOR INNER RING 23
(measured at about 23°C.)

| | A.S.T.M. Test Method | Thermoplastic Elastomer |
|---|---|---|
| Specific Gravity | D-297 | 0.88–1.2 |
| Hardness (Shore-A) | D-2240 | 40–60 |
| Tensile Strength P.S.I. | D-412 | 500–900 |
| Ultimate Elongation, % | D-412 | 400–800 |
| 300% Modulus, P.S.I. | D-412 | 250–400 |
| Tear Resistance, Die C, PLI | D-624 | 90–150 |
| Yerzley Resilience, % | D-945 | 60–90 |

Elastomer blends meeting the desired physical properties are described in detail in U.S. Pat. No. 4,041,103, issued Aug. 9, 1977 to Davison et al., and to the extent necessary for a complete description of the elastomer blend, the disclosure of that patent is incorporated herein by reference. More specifically, the block copolymer comprises at least two polymer blocks of a first polymer selected from the group consisting of monoalkenyl arene polymers and hydrogenated derivatives thereof wherein no more than about 25% of the arene double bonds have been reduced, and at least one polymer block of a $C_{4-5}$ conjugated diene polymer wherein at least about 80% of the aliphatic unsaturation of said polymer has been reduced by hydrogenation subsequent to polymerization, and said polyamide polymer comprises polyamide having 4 to 12 carbon atoms inclusive between the amide linkages which form the polymer backbone, said block copolymer and polyamide polymer being in the ratio of 100 parts by weight of block copolymer to between about 5 and about 200 parts by weight polyamide polymer. One suitable polymer blend is produced by Shell Chemical Company under the trade name "Kraton-G" and appropriate blends of various grades of "Kraton-G" can be mixed to achieve the desired physical properties within the foregoing range. It has further been discovered that by molding the "Kraton-G" elastomer blend within outer ring 15 of glass-filled polypropylene, a chemical reaction apparently takes place at the interface thereby eliminating the need for either mechanical interlocking arrangements, such as shown in U.S. Pat. No. 3,285,547, or the use of bonding agents or cements. Unexpectedly, the resulting cushion mount 11 is a substantially unitary, almost integral ring evidencing the desired stiffness at its outer periphery and the desired elasticity and resilience at its inner periphery, as well as showing substantial resistance to separation or peeling between inner and outer ring portions 23,15. While the foregoing blends have been disclosed in the formation of inner ring 23, it is contemplated that other blends may also be utilized so as to form the inner ring within the scope of the invention so as to meet the objects and advantages thereof.

While certain illustrative embodiments of the present invention have been described above in considerable detail, it should be understood that there is no intention to limit the invention to the specific forms disclosed. On the contrary, the intention is to cover all embodiments, modifications, alternative constructions, equivalents and uses falling within the spirit and scope of the invention as expressed in the appended claims.

What I claim as new and desire to secure by Letters Patent of the United States is:

1. An improvement in a cushion mount for mounting prime movers and the like on a mounting bracket therefor, said cushion mount comprising a generally rigid outer ring portion formed of reinforced polypropylene and having an outer peripheral configuration adapted for engagement with a part of the mounting bracket and an inwardly projecting rib on an inner periphery of said outer ring portion, and a generally resilient inner ring portion formed of an elastomer blend of poly(monoalkenyl arene)/hydrogenated polydiene/poly(monoalkenyl arene) block copolymer and a polyamide polymer, said inner ring portion being molded directly within said inner periphery of said outer ring portion and having an inner peripheral configuration adapted for gripping engagement with a part of the prime mover, said inner and outer ring portions defining a substantially integral cushion ring which is relatively rigid adjacent its outer periphery and relatively resilient adjacent its inner periphery.

2. A cushion mount as set forth in claim 1 wherein said reinforced polypropylene contains about 40% by weight glass fibers.

3. A cushion mount as set forth in claim 1 wherein said polymer blend has a Shore A hardness of between about 45 and about 60.

4. A cushion mount as set forth in claim 1 wherein said polymer blend has a Shore A hardness of about 50.

5. A cushion mount as set forth in claim 1 wherein said polymer blend has a Shore A hardness of between about 40 and about 60, a tensile strength of between about 500 psi and about 900 psi, a 300% moduless of between about 250 psi and about 400 psi, an elongation of between about 400% to about 800%, and a specific gravity of between about 0.88 and about 1.2, said properties being measured at about 23° C.

6. A cushion mount as set forth in claim 1 wherein said block copolymer comprises at least two polymer blocks of a first polymer selected from the group consisting of monoalkenyl arene polymers and hydrogenated derivatives thereof wherein no more than about 25% of the arene double bonds have been reduced, and at least one polymer block of a $C_{4-5}$ conjugated diene polymer wherein at least about 80% of the aliphatic unsaturation of said polymer has been reduced by hydrogenation subsequent to polymerization, and said polyamide polymer comprises a polyamide having 4 to 12 carbon atoms inclusive between the amide linkages which form the polymer backbone, said block copolymer and polyamide polymer being in the ratio of 100 parts by weight of block copolymer to between about 5 and about 200 parts by weight polyamide polymer.

7. A cushion mount as set forth in claim 1 wherein said elastomer blend is selected from those elastomer blends described in U.S. Pat. No. 4,041,103 and having the physical properties set forth in Table II, and said glass-filled polypropylene has a glass fiber content and physical properties as set forth in Table I.

* * * * *